United States Patent [19]

Lehman

[11] 4,052,079
[45] Oct. 4, 1977

[54] WHEELBARROW TRANSPORT MEANS

[76] Inventor: Maurice E. Lehman, 1960 Horseshoe Road, Lancaster, Pa. 17601

[21] Appl. No.: 692,524

[22] Filed: June 3, 1976

[51] Int. Cl.² .............................................. B62B 1/26
[52] U.S. Cl. ................ 280/47.2; 280/47.31; 280/476 R
[58] Field of Search ............... 280/47.31, 476 R, 47.2, 280/47.13 R, 43.12, 47.24, 402, 47.28

[56] References Cited

U.S. PATENT DOCUMENTS

| | | | |
|---|---|---|---|
| 1,559,646 | 11/1925 | Roemer | 280/47.31 |
| 2,460,466 | 2/1949 | Nogle | 280/476 R |
| 2,773,696 | 12/1956 | George | 280/402 X |

FOREIGN PATENT DOCUMENTS 999,781    2/1952    France ........................ 280/47.2

Primary Examiner—Joseph F. Peters, Jr.
Assistant Examiner—R. Schrecengost
Attorney, Agent, or Firm—B. P. Fishburne, Jr.

[57] ABSTRACT

To provide an economical and practical material hauling apparatus for use with a garden tractor or the like, a wheelbarrow has its leg structure supported on a dolly which is towed by the tractor through the usual drawbar means. The dolly is provided with caster wheels. The wheelbarrow wheel is rearmost in the caravan and its handles extend forwardly. Vertical articulation between the wheelbarrow leg structure and the towing dolly is provided for.

7 Claims, 3 Drawing Figures

WHEELBARROW TRANSPORT MEANS

BACKGROUND OF THE INVENTION

A definite need exists for a low cost transport means for heavy materials around the home or farm. Even the smallest farm wagons cost several hundred dollars to purchase and are not entirely suitable for small hauling applications. Moving heavy materials for any substantial distance by means of a wheelbarrow in the customary manner is very difficult and therefore not desirable or practical.

The prior art presently does not satisfy the need for a low cost, convenient and versatile hauling device for relatively small loads of material around the home or farm, and it is the objective of this invention to satisfy that need. More particularly, the invention employs the common wheelbarrow as one of its components but the wheelbarrow is not manipulated manually during hauling of the load and only during dumping or emptying of the load at the proper destination. Consequently, loads of material which cannot be conveniently transported under manual power in a wheelbarrow can be easily and economically transported by the invention, and without resorting to expensive additional equipment. The only additional equipment employed is a simple low-cost dolly which may be coupled behind a conventional garden tractor or like vehicle and which has means to connect with and support the leg structure of a wheelbarrow so that the same may be towed behind the tractor and dolly with the customary front wheelbarrow wheel arranged rearmost, rather than forwardly.

The elevated and supported wheelbarrow leg structure is safely and releasably locked to the intermediate dolly during transport of the load and the arrangement is such that the wheelbarrow can be quickly released from the dolly for manual dumping in the usual manner.

The connection between the wheelbarrow leg structure and dolly is horizontally rigid while allowing vertical hinge action between the wheelbarrow and dolly while the caravan is traveling over irregular terrain.

Caster wheels on the rear of the dolly are widely spaced for stability and allow the necessary lateral movement of the caravan during turning. Backing up of the caravan is made easy under the invention.

Other features and advantages of the invention will become apparent during the course of the following description.

BRIEF DESCRIPTION OF DRAWING FIGURES

DETAILED DESCRIPTION

Figure 1:
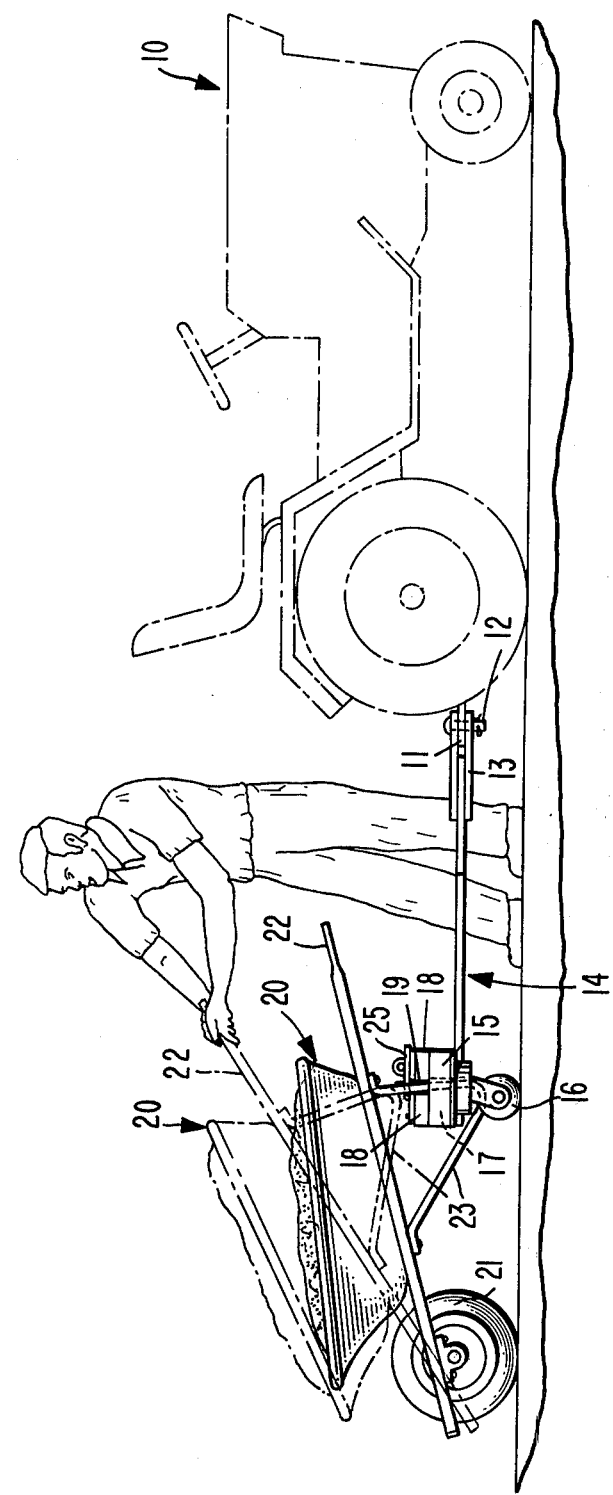
FIG. 1 is a side elevation of the invention, partly in broken lines.

Referring to the drawings in detail, wherein like numerals designate like parts, the numeral 10 designates a conventional garden tractor having a drawbar 11 adapted to be coupled by a pin means 12 with the forward tongue 13 of a low elevation substantially flat horizontal dolly 14. The dolly 14 forms a key element of the invention and comprises a rear end transverse sturdy support member 15 suitably rigidly attached to the body portion of the dolly and extending outwardly from its opposite sides and carrying a pair of widely spaced relatively large caster wheels 16 which are free-swiveling on vertical axes.

Figure 2:
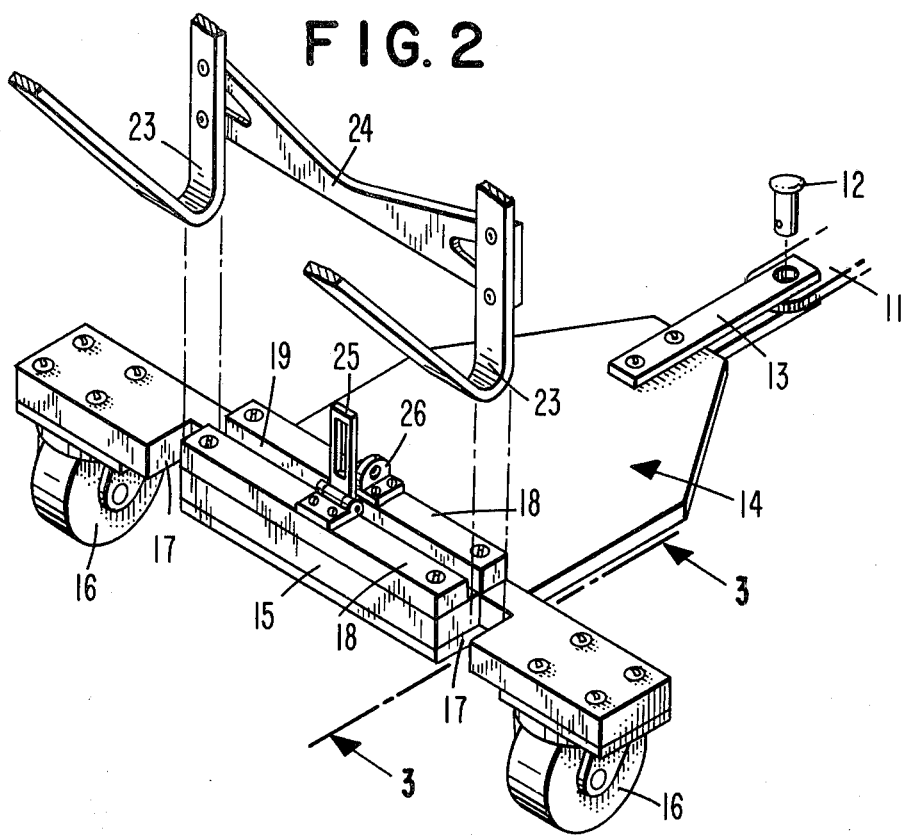
FIG. 2 is a fragmentary exploded perspective view of the invention.

A pair of wheelbarrow leg receiving notches or passages 17 are formed through the dolly member 15 at its rear side and inwardly of the two caster wheels 16. A pair of spaced parallel transverse bars 18 fixed to the top of the transverse member 15 form a transverse slot 19 between them and the ends of this slot lead into the tops of the notches 17, as clearly shown in FIG. 2. The bottom wall of the top opening slot 19 is defined by the top flat face of the member 15 between the notches or leg passages 17.

A conventional wheelbarrow 20 constitutes another component of the invention and the wheelbarrow 20 has the usual single wheel 21, lifting and transporting handles 22, and legs 23 which are rigidly connected by a crossbrace or bar 24.

Figure 3:
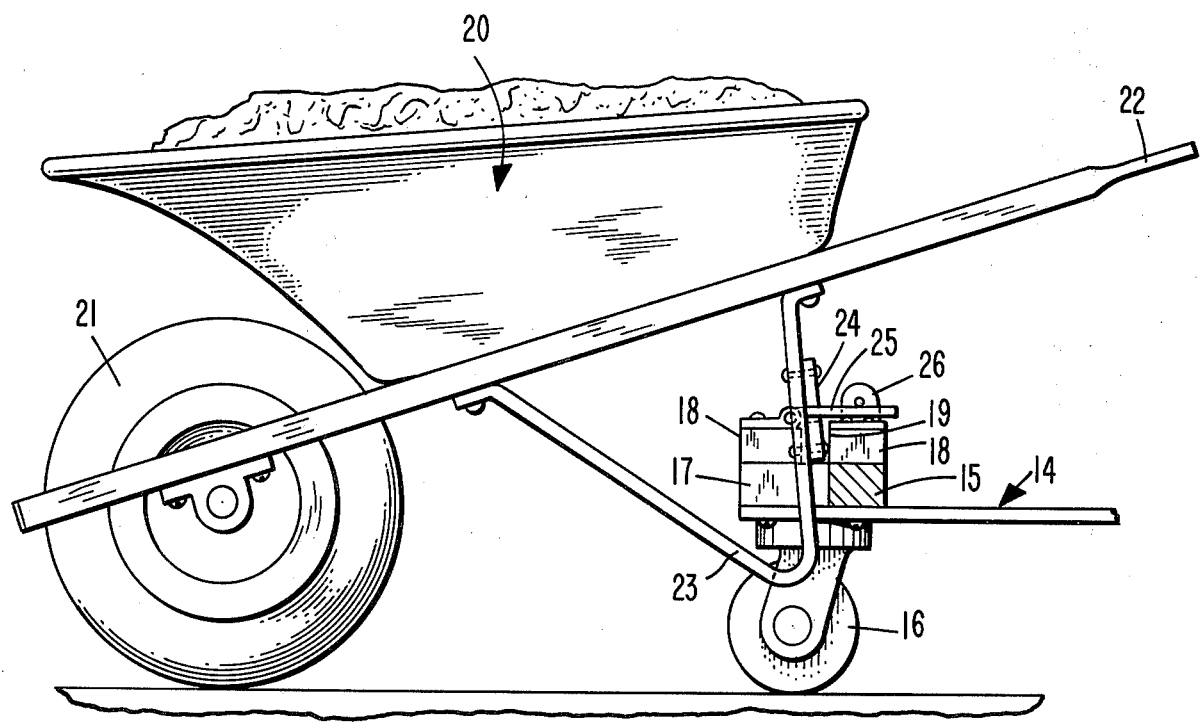
FIG. 3 is a side elevational view of the invention, partly in cross section, and taken on line 3—3 of FIG. 2.

During use, in the invention, the wheelbarrow is towed rearwardly or reversely from its customary direction of travel under manual power; that is to say, the wheel 21 is rearmost in the caravan and the handles 22 are forwardmost. The crossbrace 24 of the wheelbarrow leg structure is placed in the slot 19 and is supported on the top face of the member 15 which defines the bottom of the slot. The two depending legs 23 of the wheelbarrow extend through the notches 17 and somewhat below the body portion of the dolly 14, as shown in FIG. 3. Thus, the wheelbarrow legs are solidly supported on the dolly at a suitable elevation above the ground for ease of transportation with the dolly.

The connection between the dolly 14 and the wheelbarrow leg structure is rigid in the horizontal plane and laterally. The engagement of the legs 23 through the notches 17 prevent lateral shifting of the wheelbarrow relative to the dolly and the engagement of the brace 24 in the slot 19 prevents horizontal pivoting of the wheelbarrow relative to the dolly. The dolly caster wheels 16 allow the necessary lateral movement of the caravan. Sufficient clearance exists between the brace 24 and the side walls of the slot 19 to allow hinge action in a vertical plane between the wheelbarrow and dolly during movement over irregular terrain, as best shown in FIG. 3.

In order to releasably lock the loaded wheelbarrow to the intermediate transport dolly 14, a pivoted hasp 25 on one of the bars 18 is closed over the top center portion of the leg brace 24 and cooperates with an upstanding apertured keeper 26 on the opposing bar 18, said keeper adapted to receive a pin or other locking element for the hasp, not shown. The arrangement assures that the wheelbarrow will not separate from the dolly 14 during transportation. However, in some cases, the locking hasp may be dispensed with, if desired, or other forms of locking means may be used. Gravity will tend to keep the wheelbarrow leg structure firmly seated on the dolly.

In lieu of the slot 19 and passages 17 in the dolly for the wheelbarrow leg structure, suitable upstanding attaching elements on the dolly 14 may be coupled with the wheelbarrow legs 23 for the support and guidance of the wheelbarrow.

In addition to the structural embodiment shown in the drawings for the dolly 14, the same may be fabricated from sheet metal or may be formed in whole or in part from cast or molded materials without departing from the principles of the invention.

The resulting caravan, depicted in FIG. 1, is free articulating horizontally or laterally by virtue of the coupling pin 12, caster wheels 16 and rear wheel 21. The wheelbarrow and dolly may articulate vertically due to the described clearance between the brace 24 and sides of the slot 19. The caravan may be drawn in a straight line, is easily turned, and is easily backed up. When the desired destination is reached and after release of the hasp 25, the wheelbarrow load may be dumped manually in the customary manner with convenience and following dumping, the wheelbarrow leg structure is easily reseated on the dolly.

The full utility of the wheelbarrow 20 for normal manual usage is preserved and no structural modification of the wheelbarrow whatsoever is involved. The invention provides a ready means for the powered transportation of various loads around the home or farm without the need for purchasing an expensive wagon. The many advantages of the invention should now be readily apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A wheelbarrow transport apparatus comprising a dolly having a pair of laterally spaced rear end caster wheels and a generally horizontal body portion extending forwardly of said caster wheels and adapted for coupling to a towing vehicle, a wheelbarrow having a rear leg structure and handles and a single forward ground wheel, and means on said dolly forming a rigid supporting socket for said leg structure and receiving the leg structure and supporting the same on the dolly elevated from the ground with the wheelbarrow handles extending forwardly above the dolly and said ground wheel of the wheelbarrow arranged rearmost and rolling on the ground rearwardly of the dolly, said rigid supporting socket resisting turning of the wheelbarrow leg structure in a horizontal plane and having sufficient clearance relative to the wheel structure whereby the latter can articulate somewhat in a vertical plane relative to the dolly.

2. A wheelbarrow transport apparatus as defined in claim 1, wherein the wheelbarrow leg structure includes laterally spaced substantially vertical legs and a connecting transverse cross brace between said legs, said rigid supporting socket including a top opening transverse slot receiving said cross brace and vertical passages at the ends of said slot receiving said vertical legs.

3. A wheelbarrow transport apparatus as defined in claim 2, and a hasp device on said dolly adapted to be locked across the top of said slot for securing the cross brace therein.

4. A wheelbarrow transport apparatus as defined in claim 1, and said means on the dolly forming said rigid supporting socket disposed at the rear of the dolly and above said caster wheels, said means including a transverse support member having laterally spaced rear opening notches formed vertically therethrough, and a pair of spaced parallel transverse bars on the support member between said notches and defining an upwardly opening transverse slot having open ends communicating with the notches, said wheelbarrow leg structure including a pair of vertical legs engaging in said laterally spaced notches and a cross brace connecting said legs and resting on the top of the transverse support member within said slot.

5. A wheelbarrow transport apparatus as defined in claim 4, and means on the dolly to releasably lock said cross member in said slot.

6. A wheelbarrow transport apparatus as defined in claim 4, and said caster wheels mounted on opposite ends of said transverse support member.

7. A transport device for a conventional wheelbarrow having a single forward ground wheel, a pair of rear propelling handles, laterally spaced depending support legs on the handles and a cross brace interconnecting the support legs, said transport device comprising a low dolly having forward end draft means adapted to be coupled to a garden tractor or the like, a pair of widely spaced caster wheels on the rear end of the dolly of a size considerably smaller than the wheel of a conventional wheelbarrow, and receiver means on the dolly for the spaced vertical legs of a conventional wheelbarrow and a leg cross brace and adapted to support the rear of a wheelbarrow with the legs thereof elevated from the ground while the wheel of the wheelbarrow rolls on the ground in trailing relation to the dolly, and said receiver means constructed to resist turning of said cross brace in a horizontal plane relative to the dolly while allowing some articulative movement thereof in a vertical plane.

* * * * *